United States Patent
Chiba et al.

(10) Patent No.: US 9,359,212 B2
(45) Date of Patent: *Jun. 7, 2016

(54) COPPER FOIL FOR PRODUCING GRAPHENE AND METHOD OF PRODUCING GRAPHENE USING THE SAME

(71) Applicant: JX Nippon Mining & Metals Corporation, Tokyo (JP)

(72) Inventors: Yoshihiro Chiba, Hitachi (JP); Toshiyuki Ono, Hitachi (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/356,142

(22) PCT Filed: Oct. 31, 2012

(86) PCT No.: PCT/JP2012/078124
§ 371 (c)(1),
(2) Date: May 2, 2014

(87) PCT Pub. No.: WO2013/073367
PCT Pub. Date: May 23, 2013

(65) Prior Publication Data
US 2014/0353278 A1  Dec. 4, 2014

(30) Foreign Application Priority Data
Nov. 15, 2011 (JP) .................. 2011-249469

(51) Int. Cl.
*C01B 31/02* (2006.01)
*C22F 1/02* (2006.01)
*C22F 1/08* (2006.01)
*C23F 1/18* (2006.01)
*B82Y 30/00* (2011.01)
*B82Y 40/00* (2011.01)
*B21B 1/40* (2006.01)
(Continued)

(52) U.S. Cl.
CPC ............. *C01B 31/0453* (2013.01); *B82Y 30/00* (2013.01); *B82Y 40/00* (2013.01); *C22C 9/00* (2013.01); *C22C 9/02* (2013.01); *C22F 1/08* (2013.01); *C22F 1/18* (2013.01); *C23F 1/18* (2013.01); *B21B 1/40* (2013.01); *C22F 1/00* (2013.01); *Y10T 428/12431* (2015.01)

(58) Field of Classification Search
None
See application file for complete search history.

(56) References Cited

U.S. PATENT DOCUMENTS 7,479,590 B1    1/2009  Kuczynski
2001/0008091 A1*  7/2001 Takahashi et al. ............. 73/826
(Continued)

FOREIGN PATENT DOCUMENTS

EP    2 664 580    11/2013
JP    2000-256765    9/2000
(Continued)

OTHER PUBLICATIONS

European Search Report corresponding to European Application No. 12747854.3-1362 dated Oct. 6, 2014.
(Continued)

*Primary Examiner* — Anita Alanko
(74) *Attorney, Agent, or Firm* — Jenkins, Wilson, Taylor & Hunt, P.A.

(57) ABSTRACT

A copper foil for producing graphene including Cu having a purity of 99.95% by mass or more.

4 Claims, 1 Drawing Sheet

(51) Int. Cl.

| | |
|---|---|
| *C01B 31/04* | (2006.01) |
| *C22C 9/00* | (2006.01) |
| *C22C 9/02* | (2006.01) |
| *C22F 1/18* | (2006.01) |
| *C22F 1/00* | (2006.01) |

(56) References Cited

U.S. PATENT DOCUMENTS

| | | | |
|---|---|---|---|
| 2004/0110015 A1 | 6/2004 | Narui et al. | |
| 2009/0047539 A1* | 2/2009 | Dobashi et al. | 428/607 |
| 2009/0155561 A1 | 6/2009 | Choi et al. | |
| 2010/0038115 A1 | 2/2010 | Matsuda et al. | |
| 2011/0070146 A1 | 3/2011 | Song et al. | |
| 2011/0123389 A1* | 5/2011 | Shindo et al. | 420/499 |
| 2011/0195207 A1 | 8/2011 | Hong et al. | |
| 2011/0201739 A1 | 8/2011 | Beall | |
| 2012/0132516 A1 | 5/2012 | Zimmerman | |
| 2014/0183160 A1 | 7/2014 | Chiba et al. | |
| 2014/0196841 A1 | 7/2014 | Chiba et al. | |
| 2014/0216650 A1 | 8/2014 | Chiba | |
| 2014/0246399 A1 | 9/2014 | Chiba | |
| 2015/0232342 A1 | 8/2015 | Chiba | |
| 2015/0361584 A1 | 12/2015 | Chiba | |

FOREIGN PATENT DOCUMENTS

| | | |
|---|---|---|
| JP | 2002-120050 | 4/2002 |
| JP | 2004-074214 | 3/2004 |
| JP | 2004-284938 | 10/2004 |
| JP | 2006-281249 | 10/2006 |
| JP | 2006-326684 | 12/2006 |
| JP | 2009-143799 | 7/2009 |
| JP | 2009-215146 | 9/2009 |
| JP | 2010-227971 | 10/2010 |
| JP | 2011-051801 | 3/2011 |
| JP | 2011-063506 | 3/2011 |
| JP | 2011-070830 | 4/2011 |
| JP | 2011-136357 | 7/2011 |
| JP | 2011-162877 | 8/2011 |
| JP | 2012-006824 | 1/2012 |
| JP | 2013-107036 | 6/2013 |
| JP | 5298225 | 9/2013 |
| JP | 5721609 | 5/2015 |
| WO | WO 2011/081044 | 7/2011 |
| WO | WO 2012/111840 | 8/2012 |
| WO | WO 2012/165051 | 12/2012 |
| WO | WO 2012/165548 | 12/2012 |
| WO | WO 2013/047053 | 4/2013 |
| WO | WO 2013/065601 | 5/2013 |
| WO | WO 2013/073367 | 5/2013 |
| WO | WO 2013/168646 | 11/2013 |
| WO | WO 2014/027528 | 2/2014 |

OTHER PUBLICATIONS

International Search Report corresponding to International Patent Application No. PCT/JP2013/068636 dated Aug. 27, 2013.
Japanese Industrial Standard. JIS Z2241.
Notification of Transmittal of Translation of the International Preliminary Report on Patentability (Chapter I or Chapter II of the Patent Cooperation Treaty) corresponding to International Patent Application No. PCT/JP2013/068636 dated Feb. 26, 2015.
Official Action corresponding to U.S. Appl. No. 14/122,930 dated Feb. 20, 2015.
Official Action corresponding to U.S. Appl. No. 13/985,931 dated May 8, 2015.
Restriction Requirement corresponding to U.S. Appl. No. 14/355,348 dated Feb. 26, 2015.
Alfa Aesar, copper foil product information available online at http://www.alfa.com/ja/GP140W.pgm?task=product&srchtyp=ELEM&PSvalue=Copperfoil&element=Cu&group=988.0000 , downloaded Dec. 12, 2012.
International Search Report corresponding to International Patent Application No. PCT/JP2012/053945 dated May 29, 2012.
International Search Report corresponding to International Patent Application No. PCT/JP2012/059652 dated May 17, 2012.
International Search Report corresponding to International Patent Application No. PCT/JP2012/064077 dated Aug. 23, 2012.
International Search Report corresponding to International Patent Application No. PCT/JP2012/077745 dated Dec. 11, 2012.
International Search Report corresponding to International Patent Application No. PCT/JP2012/078124 dated Nov. 27, 2012.
Japanese Industrial Standard. JIS Z8741.
Japanese Industrial Standard. JIS-H3100.
Japanese Industrial Standard. JIS-H3250.
Japanese Industrial Standard. JIS-H3510.
Li et al., "Large-Area Synthesis of High-Quality and Uniform Graphene Films on Copper Foils," Science. vol. 324, No. 5932 pp. 1312-1314 (2009).
Luo et al., "Effect of Substrate Roughness and Feedstock Concentration on Growth of Water-Scale Graphene at Atmospheric Pressure," Chemistry of Materials. vol. 23, No. 6 pp. 1441-1447 (2011).
Notification of Transmittal of Translation of the International Preliminary Report on Patentability (Chapter I or Chapter II of the Patent Cooperation Treaty) corresponding to International Patent Application No. PCT/JP2012/053945 dated Aug. 22, 2013.
Notification of Transmittal of Translation of the International Preliminary Report on Patentability (Chapter I or Chapter II of the Patent Cooperation Treaty) corresponding to International Patent Application No. PCT/JP2012/059652 dated Dec. 2, 2013.
Notification of Transmittal of Translation of the International Preliminary Report on Patentability (Chapter I or Chapter II of the Patent Cooperation Treaty) corresponding to International Patent Application No. PCT/JP2012/064077 dated Dec. 2, 2013.
Notification of Transmittal of Translation of the International Preliminary Report on Patentability (Chapter I or Chapter II of the Patent Cooperation Treaty) corresponding to International Patent Application No. PCT/JP2012/077745 dated May 8, 2014.
Notification of Transmittal of Translation of the International Preliminary Report on Patentability (Chapter I or Chapter II of the Patent Cooperation Treaty) corresponding to International Patent Application No. PCT/JP2012/078124 dated May 15, 2014.
Written Opinion corresponding to International Patent Application No. PCT/JP2012/053945 dated Aug. 18, 2013.
Written Opinion corresponding to International Patent Application No. PCT/JP2012/077745 dated Dec. 11, 2012.
Written Opinion corresponding to International Patent Application No. PCT/JP2012/078124 dated Nov. 15, 2012.
Restriction Requirement corresponding to U.S. Appl. No. 14/122,930 dated Dec. 3, 2014.
Gao et al., "Efficient Growth of High-Quality Graphene Films on Cu Foils by Ambient Pressure Chemical Vapor Deposition," Applied Physics Letters, vol. 97, No. 18, pp. 183109-1-183109-3 (Nov. 1, 2010).
Luo et al., "Large Scale Synthesis of Bi-Layer Graphene in Strongly Coupled Stacking Order," Condensed Matter, 1-20 (Dec. 3, 2010); URL:http://aps.arxiv.org/ftp/arxiv/papers/1012/1012.0701.pdf.
Wofford et al., "Graphene Islands on Cu Foils: The Interplay between Shape, Orientation, and Defects," Nano Letters, vol. 10, pp. 4890-4896 (Oct. 27, 2010).
European Search Report corresponding to European Application No. 12793061.8-1355 dated May 12, 2015.
European Search Report corresponding to European Application No. 12793262.2-1355 dated May 12, 2015.
European Search Report corresponding to Eurpean Application No. 12845162.2-1362 dated Jan. 7, 2015.
Machine Translation, Nakamura, JP 2010-227971, Oct. 2010.
Official Action corresponding to U.S. Appl. No. 14/122,930 dated Jun. 18, 2015.
Official Action corresponding to U.S. Appl. No. 14/355,348 dated Jun. 4, 2015.

(56) References Cited

OTHER PUBLICATIONS

Smoukov et al., "Freestanding Three-Dimensional Copper Foils Prepared by Electroless Deposition on Micropatterned Gels," Advanced Materials, vol. 17, No. 6 pp. 751-755 (2005).
Sukang Bae et al., "Roll-to-roll production of 30-inch graphene films for transparent electrodes," Nature Nanotechnology, vol. 5, No. 8 pp. 574-578 (2010).
European Search Report corresponding to European Application No. 12850534.4-1362 dated Nov. 3, 2015.
Notice of Allowance corresponding to U.S. Appl. No. 13/985,931 dated Oct. 23, 2015.
Notice of Allowance corresponding to U.S. Appl. No. 14/122,930 dated Oct. 7, 2015.
Official Action corresonding to U.S. Appl. No. 14/355,348 dated Nov. 3, 2015.
Official Action corresponding to European Patent Application No. 12850534.4-1362 dated Dec. 8, 2015.
Restriction Requirement corresponding to U.S. Appl. No. 14/122,942 dated Sep. 30, 2015.
English translation, Nakamura, JP 2010-227971, from Japan Platform for Patent Information, Aug. 6, 2015.

* cited by examiner

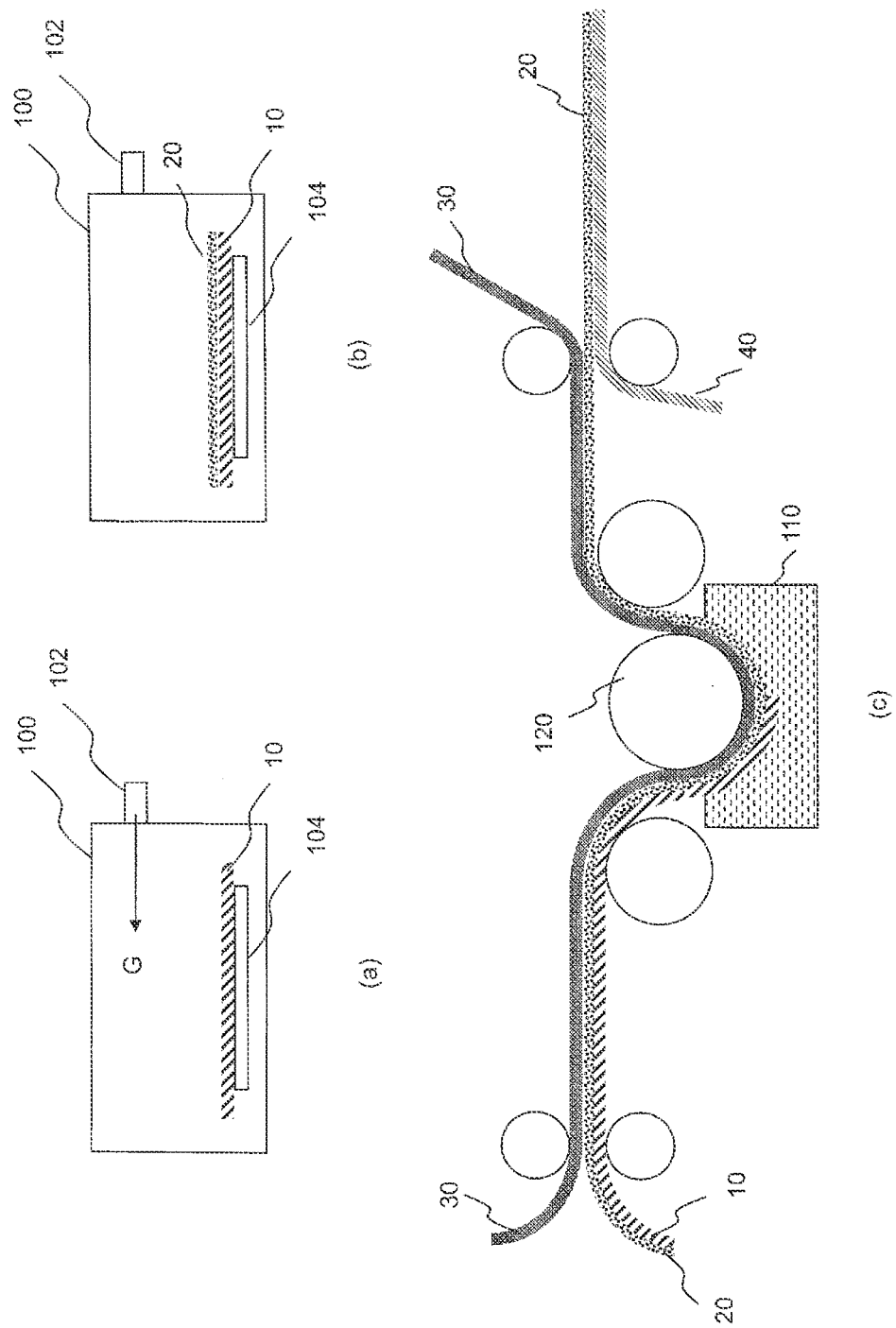

COPPER FOIL FOR PRODUCING GRAPHENE AND METHOD OF PRODUCING GRAPHENE USING THE SAME

FIELD OF THE INVENTION

The present invention relates to a copper foil for producing graphene, and a method of producing graphene using the same.

DESCRIPTION OF THE RELATED ART

Graphite has a layered structure where a plurality of layers of carbon six-membered rings planarly arranged is laminated. The graphite having a mono atomic layer or around several atomic layers is called as graphene or a graphene sheet. The graphene sheet has own electrical, optical and mechanical properties, and in particularly has a high carrier mobility speed. Therefore, the graphene sheet has expected to be applied in various industries as a fuel cell separator, a transparent electrode, a conductive thin film for a display device, a "mercury-free" fluorescent lamp, a composite material, a carrier for Drug Delivery System (DDS) etc.

As a method of producing the graphene sheet, it is known that graphite is peeled with an adhesion tape. However, there are problems in that the number of the layer(s) of the graphene sheet obtained is not uniform, a wide area graphene sheet is difficult to be provided, and it is not suitable for mass production.

A technology has been developed that a sheet-like monocrystal graphitized metal catalyst is contacted with a carboneous substance and then is heat treated to grow the graphene sheet (Chemical Vapor Deposition (CVD) method) (Patent Literature 1). As the monocrystal graphitized metal catalyst, there is described a metal substrate made of Ni, Cu or W, for example.

Similarly, a technology has been reported that a graphene film is formed by the chemical vapor deposition method on a copper layer formed on a Ni or Cu metal foil or a Si substrate. In this technology, a copper foil having a thickness of 25 μm is used, for example. In the catalog (Non-Patent Literature 2), a purity of copper used in the copper foil is written as 99.8%. The graphene film is formed at about 1000° C. under a mixed gas atmosphere containing argon, hydrogen and methane (Non-Patent Literatures 1 and 2).

PRIOR ART LITERATURE

Patent Literature

[Patent Literature 1] Japanese Unexamined Patent Publication (Kokai) 2009-143799

Non-Patent Literature

[Non-Patent Literature 1] SCIENCE Vol. 324 (2009) P1312-1314
[Non-Patent Literature 2] APPLIED PHYSICS LETTERS 97, 183109 (2010)

SUMMARY OF INVENTION

Problems to be Solved by the Invention

However, it is not easy and spends high costs to produce the monocrystal metal substrate, a wide area substrate is difficult to be provided, and a wide area graphene sheet is thus difficult to be provided, as described in Patent Document 1. On the other hand, Non-Patent Document 1 describes that Cu is used as the substrate. Graphene is not grown on a copper foil in a plane direction within a short time. A Cu layer formed on an Si substrate is annealed to provide coarse grains, thereby providing a substrate. In this case, a size of graphene is limited to the size of the Si substrate, and its production costs are high, too. In the technology described in Non-Patent Literature 2, the copper foil is used, which may decrease costs of the substrate lower than those of a copper single crystal or a Si substrate. It may possible to provide graphene having a large area.

Here, the reason for superiority of the copper as the catalyst of graphene growth is that the copper little dissolves carbon. When the copper acts as the catalyst, carbon atoms produced by thermal decomposition of a hydrocarbon gas form graphene on the surface of the copper. Once the copper is covered with graphene, the copper no longer acts as the catalyst. The hydrocarbon gas will not be further thermally decomposed, and a plurality of graphene layers is unlikely formed. Instead, a graphene monolayer is provided. In this regard, a copper monocrystal is good as a substrate for producing graphene. However, as the copper monocrystal is expensive and has a limited size, it is not suitable to form a large area graphene film.

On the other hand, the copper foil can have easily a large area. The present inventor produced graphene using the copper foil described in Non-Patent Literature 2 used as the substrate, and found that the graphene had an increased sheet resistance and could not have a practically usable quality.

Accordingly, an object of the present invention is to provide a copper foil for producing graphene and a method of producing graphene; the graphene having a large area can be produced at low costs and have a quality that satisfies practical needs.

Means for Solving the Problems

The present invention provides a copper foil for producing graphene including Cu having a purity of 99.95% by mass or more.

Preferably, the purity of Cu is 99.995% by mass or less. Preferably, a concentration of oxygen is 200 ppm by mass or less.

Further, the present invention provides a method of producing grapheme using the copper foil for producing graphene according to any one of Claims 1 to 3, comprising the steps of: providing a hydrogen and carbon-containing gas while placing the heated copper foil in a chamber to form graphene on a surface of the copper plating layer of the copper foil for producing graphene; laminating a transfer sheet on the surface of the graphene, and etching and removing the copper foil for producing graphene while transferring the graphene to the transfer sheet.

Effect of the Invention

According to the present invention, there can be provided a copper foil being capable of producing graphene having a large area with low costs and a quality that satisfies practical needs.

BRIEF DESCRIPTION OF DRAWING

FIG. 1 A process chart showing a method of producing graphene according to an embodiment of the present invention.

DESCRIPTION OF THE EMBODIMENTS

Hereinafter, a copper foil for producing graphene and a method of producing graphene according to an embodiment of the present invention will be described. The symbol "%" herein refers to % by mass, unless otherwise specified.

Composition of Copper Foil

The copper foil includes Cu having a purity of 99.95 wt % or more. As described above, when graphene is produced using the copper foil as the substrate, a sheet resistance of the graphene is increased, which may result in a poor quality. This may because that there is an area for inhibiting the growth of graphene partly on the copper foil surface, thereby being uneven catalyst functions on the surface where hydrocarbon gas is not pyrolyzed and carbon atoms of the graphene are disconnected, which may increase the sheet resistance.

In view of the above, the present inventor considers that a degree of presence of copper atoms on the copper foil surface as the catalyst affects the quality of graphene, and therefore in order to have a uniform catalyst function over an entire surface of the copper foil, elements excluding copper contained in the copper foil are limited to not more than a predetermined amount (i.e., a purity of copper is 99.95% or more).

However, the present inventor initially considers that impurities in the foil may be dissolved irrespective of their forms, and may be included in oxide, sulfide or the like. In general, a graphene film is formed on the copper foil surface by the CVD. The CVD is carried out under an atmosphere of mixed hydrocarbon gas, hydrogen gas and inert gas at 1000° C. or more. Even if copper suboxide, copper sulfide or the like exists on the copper foil surface, these impurities are easily reduced by hydrogen contained in the CVD atmosphere. Therefore, the present inventor considers that the impurities in any form do not affect the quality of graphene. However, it has been found that the impurities such as oxide and sulfide existed on the copper foil surface affect on the quality of graphene provided by reducing and dissolving at 1000° C. In other words, a lower concentration of oxygen or sulfur may be preferable. The elements dissolved in the copper foil excluding copper include the elements added positively to the copper material as well as the elements originally contained in copper as impurities. As long as the purity of copper is 99.95% or more, the impurities do not affect the quality of graphene.

Non-limiting examples of the impurities within the copper foil include O, S, P and Ag, and examples of the elements added include Ag, Sn, Ti, Ni, Mg and In.

When the purity of Cu in the copper foil is higher, the production costs are increased, a strength becomes too low to produce the foil and it is thus difficult to provide a large area. In view of the above, it is preferable that the the purity of Cu be 99.995% by mass or less.

A concentration of oxygen in the copper foil is preferably 200 ppm by mass or less.

If the concentration of oxygen exceeds 200 ppm, an amount of oxide is increased. The oxide may be reduced during the CVD such that the growth of graphene may be inhibited and a sheet resistance of the graphene may be increased. In addition, an amount of sulfur in the copper foil is preferably low. Sulfur is known as an impurity for decreasing the productivity of copper. So long as the amount of sulfur is low enough not to adversely affect the productivity, sulfur little affects the quality of graphene.

Thickness

The thickness of the copper foil is not especially limited, but is generally 5 to 150 μm. Preferably, the thickness of the copper foil is 12 to 50 μm for ease of etching and removal as described later while assuring handleability. If the thickness of the copper foil is less than 12 μm, it may be easily broken and have less handleability. If the thickness exceeds 50 μm, etching and removal may be difficult.

60 Degree Gloss 60 degree gloss (JIS Z8741) of the copper foil is preferably 400% or more, and more preferably 500% or more both in a rolling direction and a direction transverse to rolling direction.

As described later, after graphene is produced using the copper foil for producing graphene according to the present invention, the graphene is needed to be transferred from the copper foil to a transfer sheet. It is found that when a surface of the copper foil is rough, it is difficult to be transferred, and the graphene may be broken. Therefore, it is preferable that the surface irregularity of the copper foil be smooth.

An upper limit of the 60 degree gloss in the direction parallel to the rolling direction and the direction transverse to the rolling direction is not especially limited. Practically, the upper limit of the 60 degree gloss in the direction parallel to the rolling direction and the direction transverse to the rolling direction is about 800%.

In addition, in order to ease the transfer of the graphene to the transfer sheet, the surface of the copper foil for producing graphene has an arithmetic mean roughness Ra in accordance with JIS B0601 of preferably 0.25 μm or less.

Average Crystal Grain Size

By heating the copper foil after the final cold rolling at 1000° C. for 1 hour in an atmosphere containing 20% by volume or more of hydrogen and balance argon, an average crystal grain size of the copper foil heated grows to 100 μm or more.

If the average crystal grain size of the copper foil is less than 100 μm, it makes an obstacle for growth of the graphene, and the graphene is difficult to be grown in a planar direction.

The heating at 1000° C. for 1 hour in an atmosphere containing 20% by volume or more of hydrogen and balance argon is simulated for a condition of heating the copper foil for producing graphene at not less than a decomposition temperature of the carbon-containing gas when graphene is produced.

Further, the average crystal grain size is determined by measuring the copper foil with a cutting method by JIS H0501.

Using the copper foil for producing graphene as specified above, the large area graphene can be produced at low costs and a high yield.

Production of Copper Foil for Producing Graphene

The copper foil for producing graphene according to the embodiment of the present invention can be produced as follows, for example: Firstly, tough pitch copper (JIS-H3100) or oxygen free copper (JIS-H3100) is used as it is, or using high purity copper raw material directly, or by adding the predetermined elements to these copper materials as necessary, a copper ingot is produced to have a purity of 99.95% by mass or more. When tough pitch copper is used, the concentration of oxygen should not exceed 200 ppm. Then, this ingot is hot rolled, and is annealed and cold rolled repeatedly to provide a rolled sheet. The rolled sheet is annealed to be re-crystallized, and finally cold rolled to the predetermined thickness of a rolling reduction of 80 to 99.9% (preferably 85 to 99.9%, more preferably 90 to 99.9%), thereby providing a copper foil.

Method of Producing Graphene

Next, referring to FIG. 1, a method of producing graphene according to the embodiment of the present invention will be described.

First, the above-described copper foil 10 for producing graphene of the present invention is placed in a chamber (such as a vacuum chamber) 100 and is heated by a heater 104. At the same time, the pressure in the chamber 100 is reduced or the chamber 100 is vacuum-evacuated. Then, a carbon-containing gas G is fed to the chamber 100 through a gas supply inlet 102 (FIG. 1(a)). As the carbon-containing gas G, methane, ethane, propane, ethylene, acetylene, alcohol or the like is cited, but is not limited thereto. One or more of these gases may be mixed. The copper foil 10 for producing graphene may be heated at a decomposition temperature of the carbon-containing gas G or more. For example, the temperature can be 1000° C. or more. Alternatively, the carbon-containing gas G may be heated at the decomposition temperature or more within the chamber 100, and the decomposed gas may bring into contact with the copper foil 10 for producing graphene.

Then, the decomposition gas (carbon gas) is contacted with the surface of the copper foil 10 for producing grapheme, and graphene 20 is formed on the surface of the copper foil 10 for producing graphene (FIG. 1(b)).

Then, the copper foil 10 for producing graphene is cooled to normal temperature, a transfer sheet 30 is laminated on the surface of the graphene 20, and the graphene 20 is transferred to the transfer sheet 30. Next, the laminate is continuously immersed into an etching tank 110 via a sink roll 120, and the copper foil 10 for producing graphene is removed by etching (FIG. 1 (c)). In this way, the graphene 20 laminated on the predetermined transfer sheet 30 can be produced.

In addition, the laminate from which the copper foil 10 for producing graphene is removed is pulled up, and a substrate 40 is laminated on the graphene 20. While the graphene 20 is transferred to the substrate 40, the transfer sheet 30 is removed, whereby the graphene 20 laminated on the substrate 40 can be produced.

As the transfer sheet 30, a variety of resin sheets (a polymer sheet such as polyethylene, polyurethane etc.) can be used. As an etching reagent for etching and removing the copper foil 10 for producing graphene, a sulfuric acid solution, a sodium persulfate solution, a hydrogen peroxide and sodium persulfate solution, or a solution where sulfuric acid is added to hydrogen peroxide can be, for example, used. As the substrate 40, an Si, SiC, Ni or Ni alloy can be, for example, used.

EXAMPLE

Preparation of Sample

Each copper ingot (a thickness of 30 mm and a width of 100 mm) having a composition shown in Table 1 was prepared. As to a copper foil having a Cu purity of 99.999%, a copper raw material having a purity of 99.9999% was redissolved under vacuum to form an ingot. As to a copper foil having a Cu purity of 99.995% or less, oxygen free copper (JIS-H3100) was redissolved under vacuum and the purity was adjusted by adding impurity elements having components shown in Table 1 to form an ingot under argon atmosphere. When oxygen was added as the impurity, an argon gas is fed into a furnace where the ingot is formed and copper oxide was then added.

A surface of each resulting ingot was machined, was hot rolled at 800 to 900° C., was acid pickled and was cold rolled to provide a rolled plate having a thickness of 1 to 2 mm. The rolled plate was annealed at 600 to 800° C., re-crystallized, and was further cold rolled to a thickness of 7 to 50 μm such that a rolling reduction is 95 to 99.7% in a final cold rolling, thereby providing a copper foil having a thickness of 8 to 70 μm. To reach the final thickness, annealing and cold rolling may be repeated.

Measurement of 60 Degree Gross 60 degree gloss was measured for the copper foil on each surface in each Example and Comparative Example after the final cold rolling.

The 60 degree gross was measured using a gloss meter in accordance with JIS-Z8741 (trade name "PG-1M" manufactured by Nippon Denshoku Industries Co., Ltd.)

Measurement of Surface Roughness (Ra, Rz, Sm)

The surface roughness was measured for each copper foil in each Example and Comparative Example after the final cold rolling.

A contact roughness meter (trade name "SE-3400" manufactured by Kosaka Laboratory Ltd.) was used to measure an arithmetic mean roughness (Ra; μm) in accordance with JIS-B0601 was measured. As to an oil pit depth Rz, a ten point height of roughness profile was measured in accordance with JIS B0601-1994. Under the conditions of a measurement sampling length of 0.8 mm, an evaluation length of 4 mm, a cut off value of 0.8 mm and a feed rate of 0.1 mm/sec, ten measurements were done in parallel with a rolling direction at different measurement positions, and values for ten measurements were determined. As to a mean distance of the irregularities (Sm; mm), under the conditions of a measurement sampling length of 0.8 mm, an evaluation length of 4 mm, a cut off value of 0.8 mm and a feed rate of 0.1 mm/sec, ten measurements were done in parallel with a rolling direction at different measurement positions, and values for ten measurements were determined. The Sm is defined as "Mean width of the profile elements" by JIS B0601-2001 (in accordance with ISO4287-1997) that represents a surface texture by a profile curve method, and refers to an average of profile lengths of respective irregularities in a sampling length.

Measurement of Average Crystal Grain Size (GS)

The average crystal grain size was measured with a cutting method by JIS H0501 for each copper foil in each Example and Comparative Example after the final cold rolling and the heating at 1000° C. for 1 hour in the atmosphere containing 20% by volume or more of hydrogen and balance argon.

Tensile Strength (TS)

Using a tensile tester, a tensile strength in a rolling direction was measured in accordance with JIS-Z2241.

Production of Graphene

The copper foil for producing graphene (horizontal and vertical of 100×100 mm) in each Example was wound around an inner wall of a quartz tube (3 inches) within an infrared image furnace and was vacuumed (pressure: 0.2 Torr). Next, the infrared image furnace was heated to 1000° C. while a mixture gas of hydrogen and argon ($H_2$/Ar=10/400 to 5/500 sccm (Standard Cubic Centimeter per Minute)) was flowed into the quartz tube. Further, a methane gas was added and flowed at CH$_4$/H$_2$/Ar=10/10/400 to 10/5/500 sccm. The furnace was held at for one hour, and the reaction was thus performed.

A PET film was adhered to the copper foil at a graphene side where graphene was grown on the surface, and the copper foil was etched and removed by acid. Thereafter, a sheet resistance of graphene was measured by a four probe method. A reaction time was determined by finding out the relationship between the reaction time and the sheet resistance in advance and was the time needed for stabilizing the sheet resistance.

When the sheet resistance of graphene is 400 Ω/square or less, there is no practical problem.

Table 1 shows the results. In Table 1, G60$_{RD}$ represents 60 degree gloss in a rolling direction and G60$_{TD}$ represents 60 degree gloss in a direction transverse to rolling direction. And GS represents average crystal grain size.

In Table 1, "S+P+Ag<500 ppm" represents that a total concentration of S, P and Ag is less than 5 wt ppm. The total of the respective elements does not reach 100% by mass and the shortage corresponds to the inevitable impurities within the copper foil.

In Comparative Example 1 where the concentration of oxygen exceeded 200 ppm by mass, the sheet resistance of graphene exceeded 400 Ω/square and the quality of graphene was poor, although the purity of the copper foil was 99.95% by mass or more.

EXPLANATION OF REFERENCE NUMERALS

10 copper foil for producing graphene
20 graphene
30 transfer sheet

What is claimed is:

1. A rolled copper foil for producing graphene including Cu having a purity of from 99.95% by mass to 99.995% by mass, having a concentration of oxygen of 200 ppm by mass or less and having 60 degree gloss in accordance with JIS Z8741 in a rolling direction and 60 degree gloss in accordance with JIS Z8741 in a direction transverse to the rolling direction each of 400% or more, wherein an average crystal grain size of the rolled copper foil is 100 μm or more after heating at 1000° C.

2. The rolled copper foil for producing graphene according to claim 1, wherein an arithmetic surface roughness Ra in accordance with JIS B0601 of a copper foil surface is 0.25 μm or less.

TABLE 1

| | Composition of copper foil | | | | | | Surface roughness (μm) | | | | | Sheet resistance of graphene |
|---|---|---|---|---|---|---|---|---|---|---|---|---|
| | Cu purity | Oxygen | Foil thickness | Elements other than oxygen | 60 degree gloss | | | | | TS | GS | |
| | (wt %) | (wtppm) | (μm) | (wtppm) | G60$_{RD}$ | G60$_{TD}$ | Ra | Rz | Rsm | (MPa) | μm | (Ω/□) |
| Ex. 1 | 99.999 | <1 | 50 | S + P + Ag <5 ppm | 589 | 610 | 0.027 | 0.093 | 17.335 | 380 | 150 | 300 |
| Ex. 2 | 99.995 | 3 | 50 | Ag: 10 ppm, S + P <5 ppm | 612 | 631 | 0.018 | 0.074 | 16.949 | 408 | 340 | 290 |
| Ex. 3 | 99.990 | 10 | 50 | Ag: 50 ppm, S + P <20 ppm | 595 | 598 | 0.021 | 0.085 | 15.632 | 433 | 950 | 310 |
| Ex. 4 | 99.980 | 10 | 50 | Ag: 100 ppm, S + P <20 ppm | 588 | 603 | 0.032 | 0.140 | 15.441 | 490 | 910 | 330 |
| Ex. 5 | 99.980 | 10 | 50 | Ag: 300 ppm, S + P <20 ppm | 420 | 435 | 0.057 | 0.212 | 15.468 | 521 | 890 | 370 |
| Ex. 6 | 99.990 | 10 | 50 | Sn: 80 ppm, S + P <20 ppm | 616 | 607 | 0.023 | 0.105 | 16.210 | 454 | 1050 | 330 |
| Ex. 7 | 99.970 | 8 | 50 | Mg: 50 ppm, S + P <20 ppm | 571 | 562 | 0.032 | 0.142 | 16.577 | 448 | 450 | 320 |
| Ex. 8 | 99.950 | 80 | 50 | Ag: 100 ppm, S + P <20 ppm | 555 | 570 | 0.040 | 0.185 | 16.814 | 490 | 960 | 370 |
| Ex. 9 | 99.950 | 200 | 50 | Ag: 200 ppm, S + P <20 ppm | 603 | 610 | 0.021 | 0.098 | 18.223 | 503 | 950 | 380 |
| Ex. 10 | 99.990 | 10 | 35 | Ag: 50 ppm, S + P <20 ppm | 525 | 518 | 0.042 | 0.195 | 15.252 | 433 | 950 | 330 |
| Ex. 11 | 99.990 | 10 | 18 | Ag: 50 ppm, S + P <20 ppm | 595 | 598 | 0.022 | 0.104 | 13.295 | 433 | 950 | 340 |
| Ex. 12 | 99.990 | 10 | 12 | Sn: 80 ppm, S + P <20 ppm | 485 | 607 | 0.033 | 0.177 | 13.570 | 454 | 1050 | 360 |
| Ex. 13 | 99.995 | 3 | 70 | Ag: 10 ppm, S + P <5 ppm | 625 | 631 | 0.018 | 0.094 | 16.827 | 408 | 340 | 290 |
| Ex. 14 | 99.995 | 3 | 8 | Ag: 10 ppm, S + P <5 ppm | 405 | 415 | 0.057 | 0.284 | 13.878 | 408 | 340 | 380 |
| Comp. Ex. 1 | 99.970 | 250 | 50 | Ag: 10 ppm, S + P <20 ppm | 520 | 532 | 0.042 | 0.191 | 12.491 | 450 | 220 | 450 |
| Comp. Ex. 2 | 99.940 | 10 | 50 | Ag: 500 ppm, S + P <20 ppm | 245 | 223 | 0.098 | 0.594 | 9.212 | 532 | 140 | 450 |
| Comp. Ex. 3 | 99.800 | 10 | 50 | Ag: 1000 ppm, S + P <20 ppm | 184 | 192 | 0.152 | 0.813 | 9.448 | 564 | 120 | >500 |
| Comp. Ex. 4 | 99.800 | 10 | 50 | Sn: 1200 ppm, S + P <20 ppm | 202 | 219 | 0.103 | 0.606 | 9.661 | 595 | 110 | >500 |

As apparent from Table 1, in each Example where the purity of the copper foil was 99.95% by mass or more, the sheet resistance of graphene was 400 Ω/square or less and the quality was excellent.

In general, the higher the concentration of oxygen is, the higher the sheet resistance of graphene is.

Example 13 where the thickness of the copper foil exceeded 50 μm needed more time to etch the copper foil as compared to other Examples. Example 14 where the thickness of the copper foil was less than 12 μm needed more efforts to handle.

On the other hand, in each Comparative Example where the purity of copper foil was less than 99.95% by mass, the sheet resistance of graphene exceeded 400 Ω/square and the quality of graphene was poor.

3. A method of producing graphene using the rolled copper foil for producing graphene according to claim 1, comprising the steps of:

providing a carbon-containing gas while placing the heated copper foil in a chamber to form graphene on a surface of the copper foil for producing graphene; and laminating a transfer sheet on the surface of the graphene, and etching and removing the copper foil for producing graphene while transferring the graphene to the transfer sheet.

4. A method of producing graphene using the rolled copper foil for producing graphene according to claim 2, comprising the steps of:

providing a carbon-containing gas while placing the heated copper foil in a chamber to form graphene on a surface of the copper foil for producing graphene; and laminating a transfer sheet on the surface of the graphene, and etching and removing the copper foil for producing graphene while transferring the graphene to the transfer sheet.

\* \* \* \* \*